United States Patent
Kobayashi et al.

(10) Patent No.: US 8,537,202 B2
(45) Date of Patent: Sep. 17, 2013

(54) VIDEO PROCESSING APPARATUS AND VIDEO PROCESSING METHOD

(75) Inventors: Mamoru Kobayashi, Fukaya (JP); Shin Miyahara, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 38 days.

(21) Appl. No.: 13/372,355

(22) Filed: Feb. 13, 2012

(65) Prior Publication Data

US 2012/0268560 A1  Oct. 25, 2012

(30) Foreign Application Priority Data

Apr. 25, 2011  (JP) ................... 2011-097473

(51) Int. Cl.
*H04N 13/00* (2006.01)
*H04N 13/04* (2006.01)

(52) U.S. Cl.
USPC ............................. 348/43; 348/51

(58) Field of Classification Search
USPC ...................................... 348/43, 51
See application file for complete search history.

(56) References Cited

U.S. PATENT DOCUMENTS

2012/0162365 A1* 6/2012 Miura et al. ............... 348/43

FOREIGN PATENT DOCUMENTS

| JP | 11-069384 | 3/1999 |
| JP | 2010-068309 | 3/2010 |
| JP | 2010-068315 | 3/2010 |
| JP | 2010-288234 | 12/2010 |

OTHER PUBLICATIONS

Japanese Office Action dated Apr. 19, 2012, filed in Japanese counterpart Application No. 2011-097473, 5 pages (in English).

* cited by examiner

*Primary Examiner* — Sath V Perungavoor
*Assistant Examiner* — Xiaolan Xu
(74) *Attorney, Agent, or Firm* — Patterson & Sheridan, LLP

(57) ABSTRACT

According to one embodiment, a histogram generator configured to generate a histogram based on luminance levels of pixels represented by video signals; and a determination module configured to determine whether the video signals represent a stereoscopic video based on the histogram.

4 Claims, 4 Drawing Sheets

HA= HC, HB≅ HD···Side By Side IMAGE

VIDEO PROCESSING APPARATUS AND VIDEO PROCESSING METHOD

CROSS REFERENCE TO RELATED APPLICATION(S)

The application is based upon and claims the benefit of priority from Japanese Patent Application No. 2011-097473 filed on Apr. 25, 2011, the entire contents of which are incorporated herein by reference.

BACKGROUND

1. Field

Embodiments of the present invention relate to a video processing apparatus and method for automatically detecting each of a side-by-side format and a top-and-bottom format of stereoscopic video signals.

2. Description of the Related Art

In recent years, stereoscopic video contents provided by broadcasting have emerged. Television (TV) sets are marketed, which can handle stereoscopic video contents transmitted with formats, such as a side-by-side format, a top-and-bottom format, and a frame-packing format. However, currently, each of stereoscopic video signals respectively having no three-dimensional (3D) flag transmitted with such formats except some formats cannot automatically be determined as a 2D/3D video signal.

That is, there are demands for automatically detecting each of formats with which stereoscopic video signals are transmitted, and for automatically determining which of a two-dimensional (2D) video signal and a 3D video signal each video signal is (i.e., performing "2D/3D determination").

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

According to one embodiment, a video processing apparatus includes: a histogram generator configured to generate a histogram based on luminance levels of pixels represented by video signals; and a determination module configured to determine whether the video signals represent a stereoscopic video based on the histogram.

Hereinafter, an embodiment of the invention is described with reference to FIGS. 1 to 4.

Figure 1:
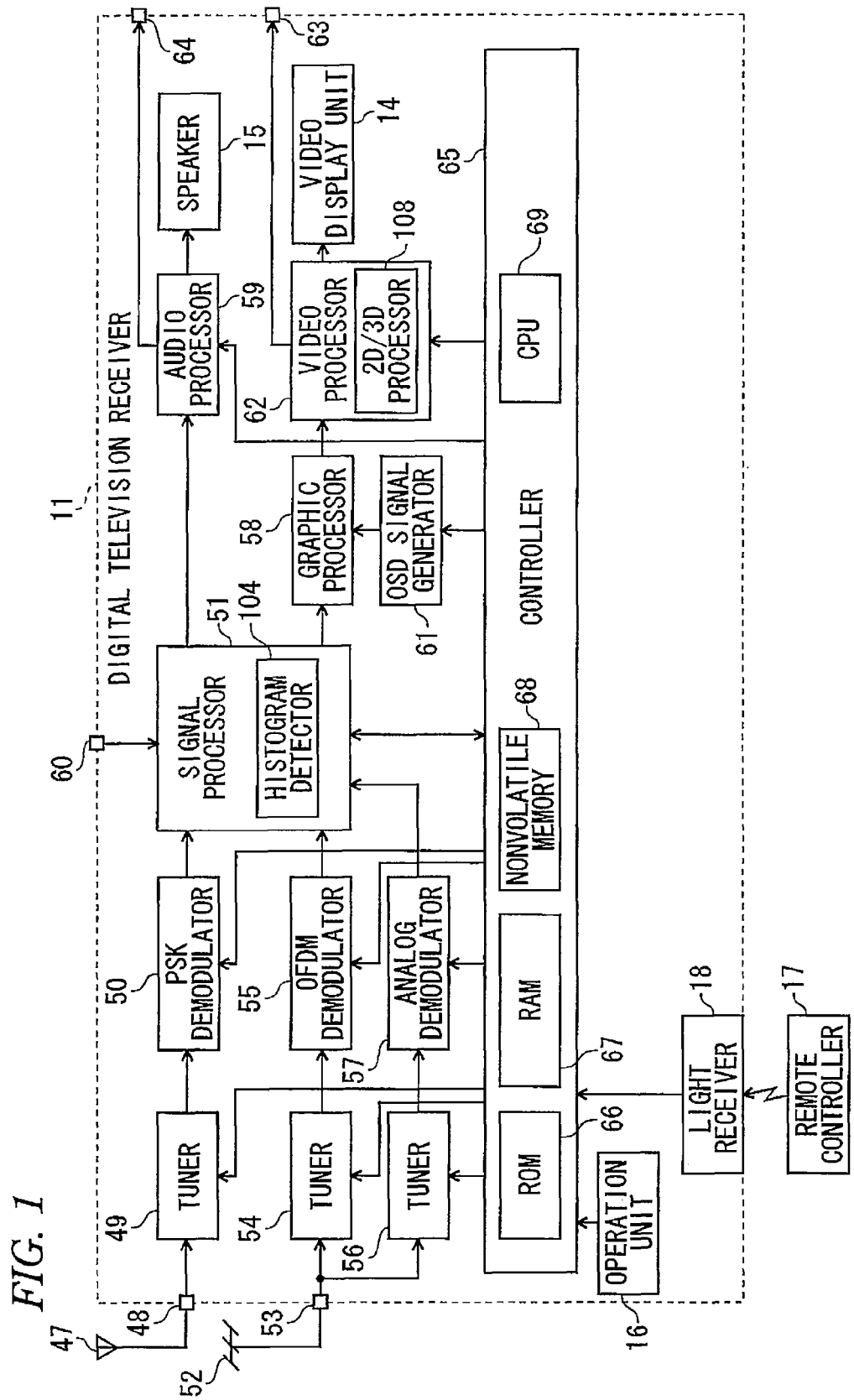
FIG. 1 is a block diagram illustrating the configuration of a video processing apparatus that is an embodiment of the present invention.

First, a digital television receiver 11 is described with reference to FIG. 1 as an example of a video processing apparatus that is an embodiment of the invention.

The digital television receiver 11 includes a video display unit 14, a speaker 15, an operation unit 16, a light receiver 18, broadcast signal input terminals 48, and 53, an analog signal input terminal 60, output terminals 63 and 64, tuners 49, 54, and 56, a phase shift keying (PSK) demodulator 50, an orthogonal frequency division multiplexing (OFDM) demodulator 55, an analog demodulator 57, a signal processor 51, an audio processor 59, a graphic processor 58, a video processor 62, an on-screen display (OSD) signal generator 61, a controller 65, and the like.

A broadcast-satellite/communication-satellite (BS/CS) digital-broadcast receiving antenna 47 and a terrestrial broadcast receiving antenna 52 are connected to the broadcast signal input terminals 48 and 53, respectively. The light receiver 18 receives signals output from a remote controller 17. The remote controller 17 is provided with an automatic format determination button (not shown) which will be described below and is used by a user when the 2D/3D determination is needed.

The controller 65 controls an operation of each portion of the digital television receiver 11. The controller 65 includes a central processing unit (CPU) 69, a read-only memory 66, a random access memory 67, and a nonvolatile memory 68. The ROM 66 stores a control program to be executed by the CPU 69. The nonvolatile memory 68 stores various setting information and control information. The CPU 69 loads into the RAM 67 instruction groups and data necessary for processing. Then, the CPU 69 performs processing.

Operation information output from the operation unit 16, and that output from the remote controller 17 and received from the light receiver 18 are input to the controller 65. The controller 65 performs each portion of the digital television receiver 11 so as to reflect the contents of operations, which are represented by the operation information.

The BS/CS digital-broadcast receiving antenna 47 receives satellite digital-television broadcast signals. The BS/CS digital-broadcast receiving antenna 47 outputs, to the satellite digital-broadcast tuner 49 via the input terminal 48, the received satellite digital-television broadcast signals. The tuner 49 selects, from the broadcast signals output by the BS/CS digital-broadcast receiving antenna 47, the broadcast signals of a channel selected by a user. The tuner 49 outputs the selected broadcast signals to the PSK demodulator 50. The demodulator 50 demodulates the broadcast signals selected by the tuner 49 into digital video signals and digital audio signals. The PSK demodulator 50 outputs to the signal processor 51 the digital video signals and the digital audio signals obtained by demodulation.

The terrestrial broadcast receiving antenna 52 receives terrestrial digital-television broadcast signals and terrestrial analog-television broadcast signals. The terrestrial broadcast receiving antenna 52 output, to the tuner via the input terminal 53, the terrestrial digital-television broadcast signal. The tuner 54 selects, from the broadcast signals output by the terrestrial broadcast receiving antenna 52, broadcast signals of a channel selected by a user. The tuner 54 outputs to the OFDM demodulator 55 the selected broadcast signals. The OFDM demodulator 55 demodulates the broadcast signals selected by the tuner 54 into digital video signals and digital audio signals. The OFDM demodulator 55 outputs to the signal processor 51 the digital video signal and the digital audio signal obtained by demodulation.

The terrestrial broadcast receiving antenna 52 outputs terrestrial analog-television broadcast signal to the terrestrial analog broadcast tuner 56 to the terrestrial analog broadcast tuner 56 via the input terminal 53. The tuner 56 selects the broad signals of a channel selected by a user from the terrestrial analog-television broadcast signals output from the terrestrial broadcast receiving antenna 52. The tuner 56 outputs to the analog demodulator 57 the selected broadcast signals. The analog demodulator 57 demodulates the broadcast signal selected by the tuner 56 into analog video and audio signals. The analog demodulator 57 outputs, to the signal processor 51, the demodulated analog video and audio signals.

The input terminal 60 is connected to the signal processor 51. The input terminal 60 is a terminal for inputting, from an external device, analog video and audio signals to the digital-television receiver 11. The signal processor 51 converts the analog video signal and the audio signals input via the analog demodulator 57 and the input terminal 60 into a digital video signal and a digital audio signal, respectively.

The signal processor 51 performs predetermined digital signal processing on the digital video signal and the digital audio signal, which are obtained by conversion, the analog video signal and the analog audio signal input from the PSK demodulator 50 or the OFDM demodulator 55. The signal processor 51 outputs the video signal and the audio signal, on which the predetermined processing is performed, to the graphic processor 58 and the audio processor 59, respectively.

The graphic processor 58 superimposes an image of a menu or the like, which is represented by OSD signals generated by the OSD signal generator 61, on an image represented by digital video signals output from the signal processor 51. The graphic processor 58 outputs to the video processor 62 the video signals on which the OSD signals are superimposed. The graphic processor 58 can selectively output a video signal output from the signal processor 51 and an OSD signal output from the OSD signal generator 61.

The video processor 62 converts a input digital video signal into an analog video signal that can be displayed by the video display unit 14. The video processor 62 outputs the analog video signal to the video display unit 14. The video display unit 14 displays an image based on the analog video signal input thereto. In addition, the video processor 62 can guide an analog video signal to an external device via the output terminal 63.

The audio processor 59 converts a digital audio signal input thereto into an analog audio signal that can be reproduced by the speaker 15. The audio processor 59 outputs the analog audio signal to the speaker 15. The speaker 15 reproduces audio based on the analog audio signal input thereto. In addition, the audio processor 59 can lead the analog audio signal to an external device via the output terminal 64.

The signal processor 51 includes a histogram detector 104. A capture buffer (not shown), which is described below, is provided in the histogram detector 104 or provided outside the histogram detector 104 to supply a signal representing an input image set as a still image to the histogram detector 104.

The video processor 62 includes a 2D/3D processor 108. In the signal processor 51, among video signals 101 to be processed, e.g., a luminance signal (Y) 101a is input to the histogram detector 104. The histogram detector 104 generates a histogram from the luminance signal (Y) 101a. Then, the histogram detector 104 generates parameters used in display generated by the 2D/3D processor 108, based on the generated histogram (and each determination result illustrated in FIG. 4). In the video processor 62, the video signal 101 is input to the 2D/3D processor 108. The 2D/3D processor 108 displays an image represented by the video signal 101, based on the parameters generated by the histogram detector 104.

Figure 2A:
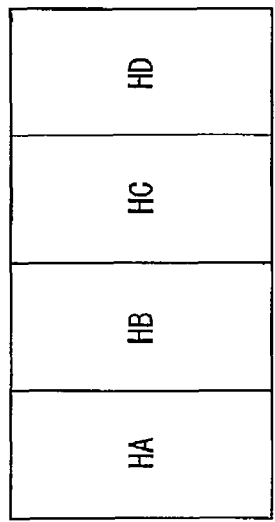
FIGS. 2A and 2B are a diagram and histograms, each for illustrating a luminance histogram window according to the embodiment for determining whether an image is formed with a side-by-side (hereinafter abbreviated as SBS) format.
Figure 2B:
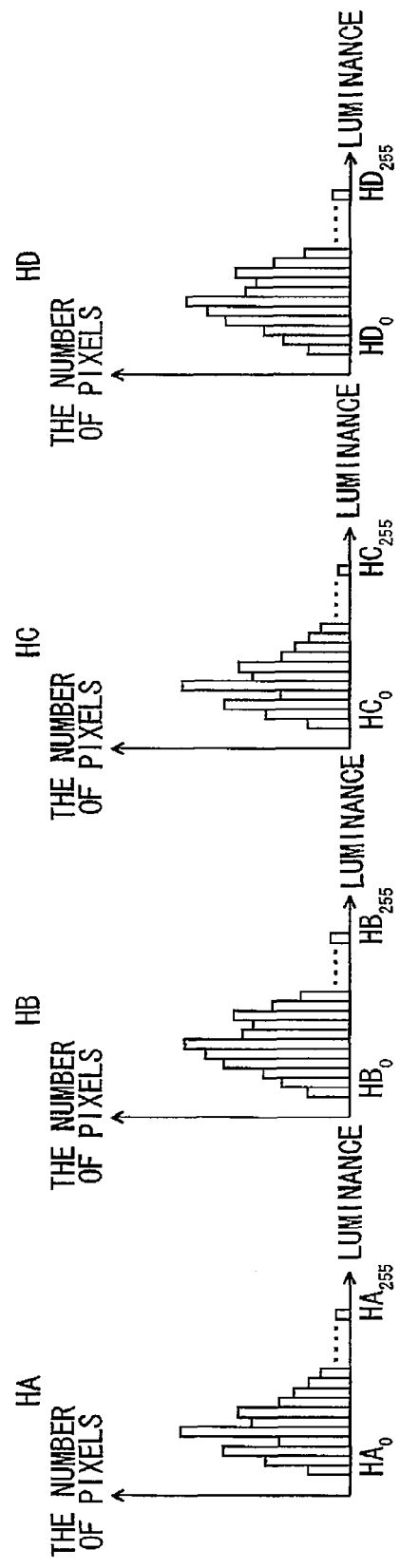

FIGS. 2A and 2B are a diagram and histograms, each for illustrating a luminance histogram window for performing the SBS (hereinafter abbreviated as SBS) determination.

As illustrated in FIG. 2A, the region of the screen is divided into four window areas HA, HB, HC, and HD, each of which extends longitudinally. Then, a luminance histogram corresponding to each of the four window areas HA, HB, HC, and HD is acquired. As illustrated in FIG. 2B, the number of pixels having a luminance level corresponding to each of values from 0 to 255 is tallied in each of the four window areas HA, HB, HC, and HD, as will be described below.

Figure 3A:
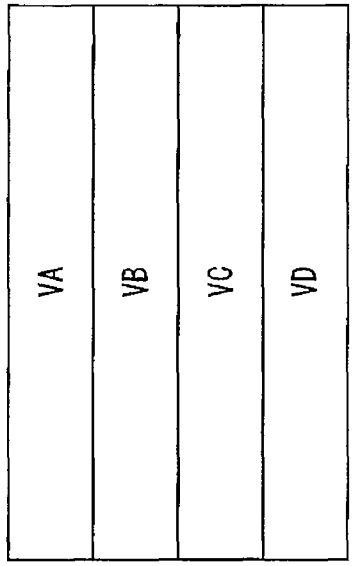
FIGS. 3A and 3B are a diagram and histograms, each for illustrating a luminance histogram window according to the embodiment for determining whether an image is formed with a top-and-bottom (hereinafter abbreviated as TAB) format.
Figure 3B:
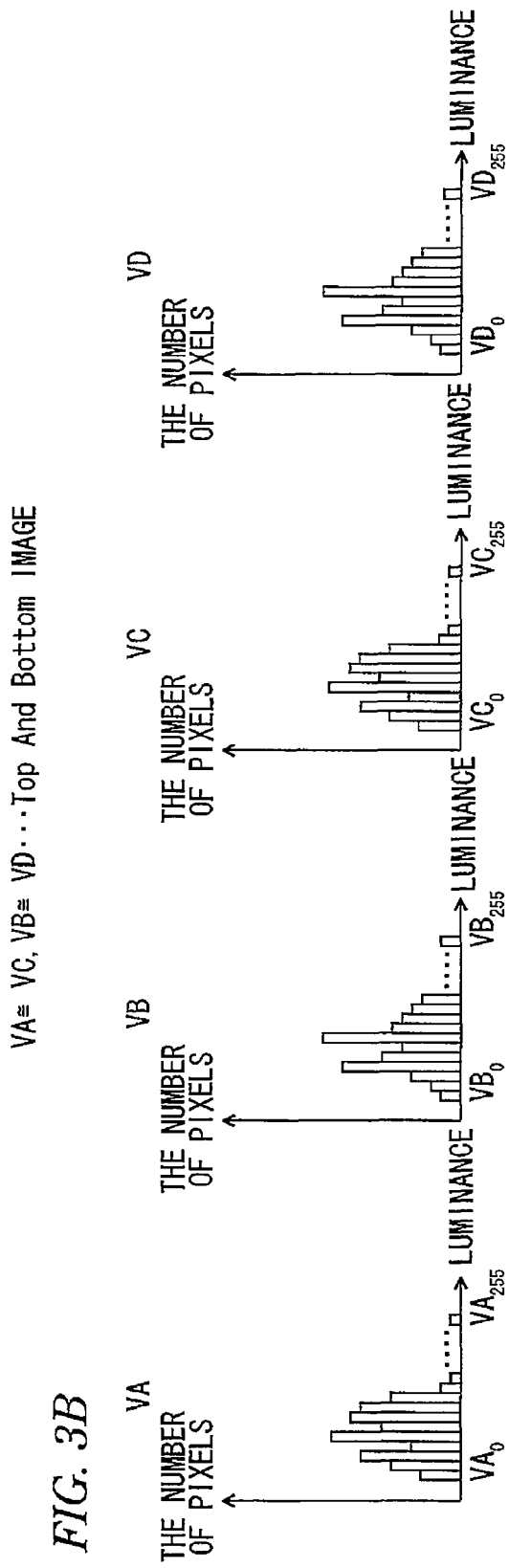

FIGS. 3A and 3B are a diagram and histograms, each for illustrating a luminance histogram window 104 for performing the TAB (hereinafter abbreviated as TAB) determination.

As illustrated in FIG. 3A, the region of the screen is divided into four window areas VA, VB, VC, and VD, each of which extends laterally. Then, a luminance histogram corresponding to each of the four window areas VA, VB, VC, and VD is acquired. As illustrated in FIG. 3B, the number of pixels having a luminance level corresponding to each of values from 0 to 255 is tallied in each of the four window areas VA, VB, VC, and VD, as will be described below.

Figure 4:
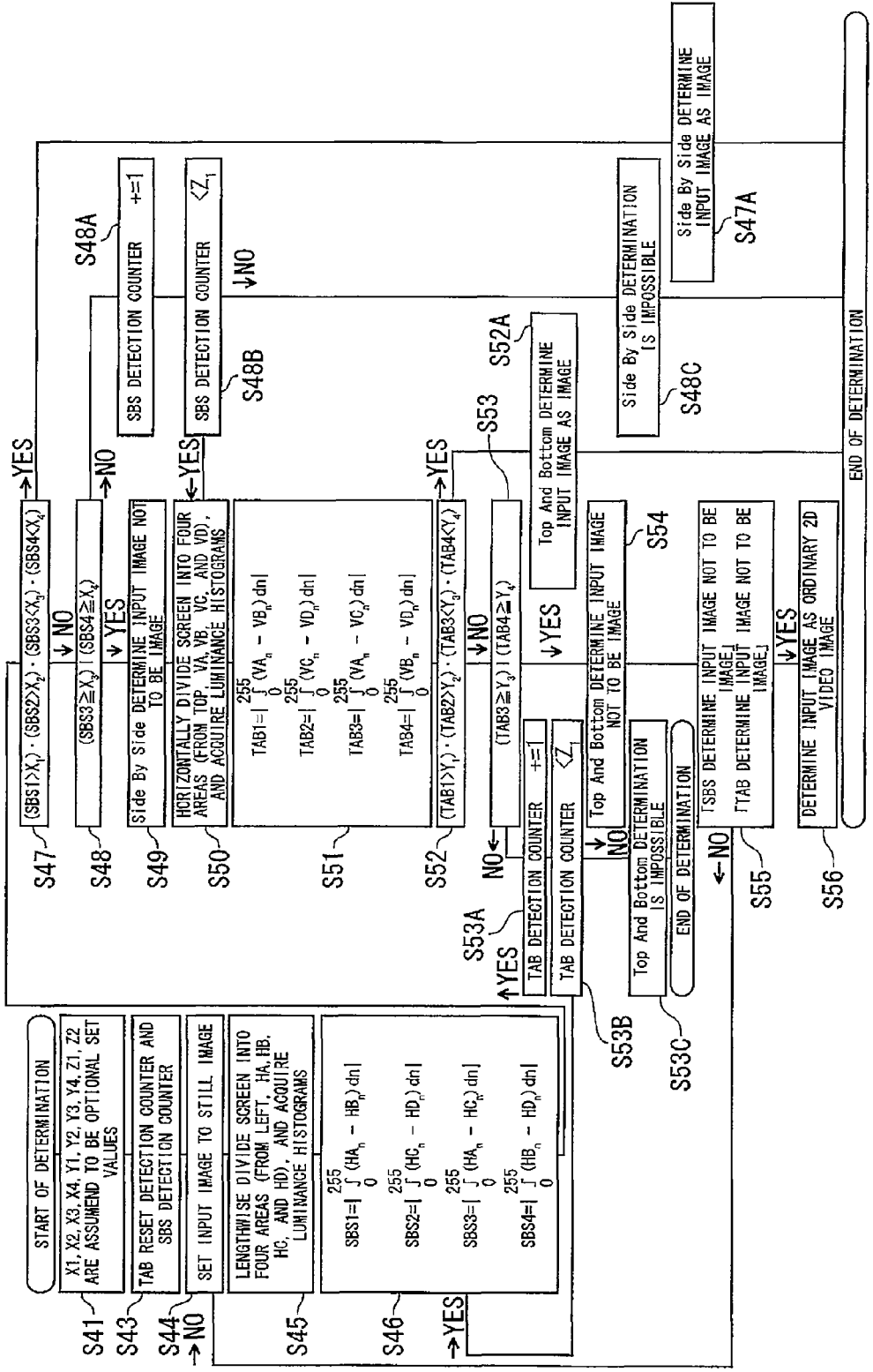
FIG. 4 is a flowchart illustrating a process of performing the SBS determination and the TAB determination according to the embodiment of the invention.

FIG. 4 is a flowchart illustrating a process of performing the SBS determination and the TAB determination according to the present embodiment of the invention. The signal processor 51 is triggered through the controller 65 by a user's operation of pushing the above automatic format determination button. Thus, the process is started.

First, in step S41, optional setting values X1, X2, X3, X4, Y1, Y2, Y3, Y4, Z1, and Z2 are set. At that time, in step S43, an SBS detection counter and a TAB detection counter are reset. Then, in step S44, an input image to the signal processor 51 is set to a still image, and stored in the capture buffer. In step S45, first, to perform the SBS determination corresponding to the side-by-side format on the stored still image, the region of the screen is divided into the four window areas HA, HB, HC, and HD, each of which extends longitudinally. Then, a luminance histogram corresponding to each of the four window areas HA, HB, HC, and HD is acquired.

FIG. 2B illustrates the histogram windows. A calculation method is performed as follows. In step S46, the absolute value SBS1 of the summation of the difference in the number of pixels corresponding to each luminance between the areas HA and HB from 0 to 255 with respect to the luminance is calculated. In addition, similarly, the absolute value SBS2 corresponding to a pair of the areas HC and HD, that SBS3 corresponding to a pair of the areas HA and HC, and that SBS4 corresponding to a pair of the areas HB and HD are calculated. In step S47, it is determined using results of the calculation in step S46 whether the following conditions are satisfied ("Determination 1"): (SBS1>X1) and (SBS2>X2) and (SBS3<X3) and (SBS4<X4). If it is determined that such conditions are satisfied (Yes in step S47), in step S47A, it is determined that the input image can be identified as an "SBS image" which is an image generated in the side-by-side format. Then, the process is ended. If it is determined that such conditions are not satisfied (No in step S47), in step S48, it is determined whether the following conditions are satisfied ("Determination 2"): (SBS3≧X3) or (SBS4≧X4). If it is determined that these conditions are satisfied (Yes in step S48), in step S49, it can be determined that the input image is an SBS image. Then, the process proceeds to step S50 in which the following "TAB determination" is performed. If it is determined that the conditions of "Determination 2" are not satisfied (No in step S48), in step S48A, the value of an SBS detection counter is incremented by 1. Then, in step S48B, it is determined whether the following condition is satisfied ("Determination 3"): (the value of the SBS detection counter) <Z1. If the condition of "Determination 3" is satisfied (Yes in step S48B), the process proceeds to step S50 from which the next TAB determination is performed. If the condition of "Determination 3" is not satisfied (No in step S48B), in step S48C, it is determined that the input image cannot be identified as an "SBS image". Then, the process is ended.

Next, the TAB determination is performed as the next step, after "Determination 2" or "Determination 3" is affirmatively made. In step S50, the histogram corresponding to each of the four areas VA, VB, VC, and VD, into which the region of the screen is divided so that the four areas VA, VB, VC, and VD extend laterally, is acquired. FIGS. 3A and 3B illustrate the histogram windows. A calculation method is performed as follows. In step S51, the absolute value TAB1 of the summation of the difference in the number of pixels corresponding to each luminance between the areas VA and VB from 0 to 255 with respect to the luminance is calculated. In addition, similarly, the absolute value TAB2 corresponding to a pair of the areas VC and VD, that TAB3 corresponding to a pair of the areas VA and VC, and that TAB4 corresponding to a pair of the areas VB and VD are calculated. In step S52, it is determined using results of the calculation in step S51 whether the following conditions are satisfied ("Determination 4"): (TAB1>Y1) and (TAB2>Y2) and (TAB3<Y3) and (TAB4<Y4). If it is determined that such conditions are satisfied (Yes in step S52), in step S52A, it is determined that the input image can be identified as a "TAB image" which is an image generated in the top-and-bottom format. Then, the process is ended. If it is determined that such conditions are not satisfied (No in step S52), in step S53, it is determined whether the following conditions are satisfied ("Determination 5"): (TAB3≧Y3) or (TAB4≧Y4). If it is determined that these conditions are satisfied (Yes in step S53), in step S54, it can be determined that the input image is not a TAB image. Then, the process proceeds to step S55 in which the following "Determination 7" is performed. If it is determined that the condition of "Determination 5" is not satisfied (No in step S53), in step S53A, the value of a TAB detection counter is incremented by 1. Then, in step S53B, it is determined whether the following condition is satisfied ("Determination 6"): (the value of the SBS detection counter)<Z2. If the condition of "Determination 6" is satisfied (Yes in step S53B), the process returns to step S46 from which the SBS determination is performed again by calculating the absolute values SBS1 to SBS4. If the condition of "Determination 6" is not satisfied (No in step S53B), in step S53C, it is determined that the input image cannot be identified as a "TAB image". Then, the process is ended.

Finally, "Determination 7" that is a next step after "Determination 5": in the next step S55 after "Determination 5" is affirmative, it is determined whether both of the following conditions are satisfied. That is, the conditions are that the input image is not an "SBS image", and that the input image is not a "TAB image". If it is determined that both of such conditions are met (Yes in step S55), in step S56, it is determined that the input image is an ordinary 2D image. Then, the process is ended. If it is determined that not all of the conditions in step S55 are met (No in step S55), the process returns to step S44 in which the input image is set to be a still image, and in which the input is stored in the capture buffer.

The above apparatus according to the present embodiment utilizes the luminance histograms. However, the apparatus according to the invention can utilize hue histograms.

According to the above embodiment, even when each input signal representing an input image has no 3D flag, it can be determined which of an "SBS image", a "TAB image" and an ordinary 2D image the input image is.

According to the invention, it can be determined with high accuracy by a simple operation which of an "SBS image", a "TAB image" and an ordinary 2D image the input image is. In addition, settings specific to stereoscopic video images can be performed using such determination. For example, appropriate video images can be obtained by enhancing the feeling of sharpness, as compared with 2D images.

Advantages obtained by the present embodiment are described below.

(1) It can be determined, using the histograms, whether an input signals having no 3D flag is generated with a side-by-side format and whether an input signals having no 3D flag is generated with a top-and-bottom format.

(2) If an input signal is a stereoscopic video signal, the screen of the display is automatically changed to a 3D-screen.

In addition, the invention is not limited to the above embodiment, and can be embodied by being variously modified without departing from the substance thereof.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video processing apparatus comprising:
   a histogram generator configured to:
   divide an area of a screen, in which a video is displayed, in to first to fourth areas in a longitudinal direction, and generate luminance histograms corresponding to the first to fourth areas respectively based on levels of pixels of the first to fourth areas; and
   divide the area in to fifth to eighth areas in a lateral direction, and generate luminance histograms corresponding to the fifth to eighth areas respectively based on levels of pixels of the fifth to eighth areas; and
   a determination module configured to:
   compare the luminance histograms corresponding to the first to fourth areas;
   compare the luminance histograms corresponding to the fifth to eighth areas;
   determine whether the video represents a stereoscopic video and, if the video represents stereoscopic video, a format of the stereoscopic video based on a first result of a comparison of the luminance histograms corresponding to the first to fourth areas and a second result of a comparison of the luminance histograms corresponding to the fifth to eighth areas.

2. The video processing apparatus according to claim 1, wherein
   the determination module detects whether the video signal represents a side-by-side image based on the first result, and whether the video signal represents a top-and-bottom image based on the second result.

3. The video processing apparatus according to claim 1, further comprising:
   a display configured to display the stereoscopic video image.

4. A video processing method comprising:
dividing an area of a screen, in which a video is displayed, in to first to fourth areas in a longitudinal direction, and generate luminance histograms corresponding to the first to fourth areas respectively based on levels of pixels of the first to fourth areas;
dividing the area in to fifth to eighth areas in a lateral direction, and generate luminance histograms corresponding to the fifth to eighth areas respectively based on levels of pixels of the fifth to eighth areas;
comparing the luminance histograms corresponding to the first to fourth areas;
comparing the luminance histograms corresponding to the fifth to eighth areas; and
determining whether the video represents a stereoscopic video and, if the video represents stereoscopic video, a format of the stereoscopic video based on a first result of a comparison of the luminance histograms corresponding to the first to fourth areas and a second result of a comparison of the luminance histograms corresponding to the fifth to eighth areas.

\* \* \* \* \*